United States Patent [19]

Zhukovskiy et al.

[11] Patent Number: 5,693,433
[45] Date of Patent: Dec. 2, 1997

[54] LITHIUM-ION-CONDUCTIVE SOLID POLYMER ELECTROLYTE AND METHOD FOR ITS PREPARATION

[75] Inventors: Vladimir Mihailovitch Zhukovskiy; Andrey Leonidovitch Kruglyashoy; Irina Evgenievna Animitsa; Olga Victorovna Bushkova; Yaroslav Arturovitch Krasnobaev; Anna Isaakovna Suvorova, all of Ekaterinburg, Russian Federation

[73] Assignee: Technology Resources International, Inc., Arlington, Va.

[21] Appl. No.: 583,001

[22] PCT Filed: Oct. 14, 1993

[86] PCT No.: PCT/US93/09859

§ 371 Date: Mar. 21, 1996

§ 102(e) Date: Mar. 21, 1996

[87] PCT Pub. No.: WO95/02314

PCT Pub. Date: Jan. 26, 1995

[30] Foreign Application Priority Data

Jan. 7, 1993 [RU] Russian Federation ............ 93034570

[51] Int. Cl.$^6$ .................... H01M 10/38; H01M 10/36
[52] U.S. Cl. ........................... 429/192; 252/62.2
[58] Field of Search .................... 429/191, 192; 252/62.2

[56] References Cited

U.S. PATENT DOCUMENTS 4,654,279   3/1987   Bauer et al. .................... 429/192

FOREIGN PATENT DOCUMENTS 3210313   9/1991   Japan .

*Primary Examiner*—John S. Maples
*Attorney, Agent, or Firm*—Armstrong, Westerman, Hattori, McLeland & Naughton

[57] ABSTRACT

Solvent-free, lithium-ion conductive solid polymer electrolytes containing an amorphous polyacrylonitrile polymer and an ionizable lithium salt are disclosed. The solid polymer electrolyte is prepared using a method that produces a solvent-free amorphous polyacrylonitrile copolymer without causing nitrile cyclization or cross-linking reactions to occur.

24 Claims, 1 Drawing Sheet

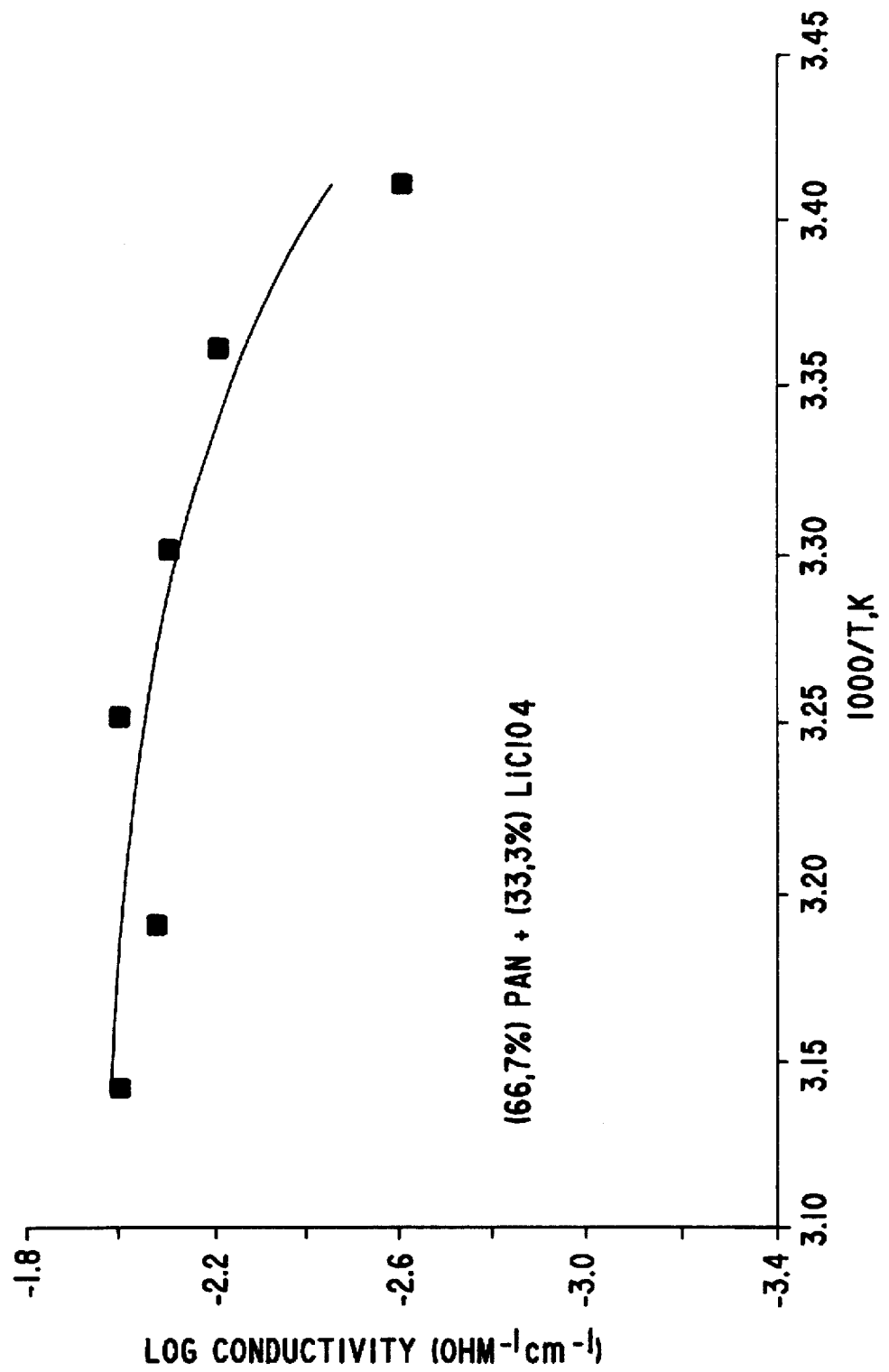

LITHIUM-ION-CONDUCTIVE SOLID POLYMER ELECTROLYTE AND METHOD FOR ITS PREPARATION

FIELD OF THE INVENTION

The subject invention relates to ionically conductive solid polymer electrolytes and their method of preparation. More specifically, the subject invention relates to lithium-ion conductive solid polymer electrolytes comprising a substantially solvent-free electrolyte including an amorphous polyacrylonitrile copolymer and an ionizable lithium salt.

BACKGROUND OF THE INVENTION

There has been considerable interest in recent years in developing solid polymer electrolytes (SPE's) that may be used in electrochemical devices, for example, in fuel cells, supercapacitors, electrochromic devices and sensors. Such devices typically include an anode, a cathode and an electrolyte that has high ionic conductivity. Although the potential advantages offered by solid polymer electrolytes in such devices have been recognized for several years, D. F. Shriver et al., "Solid Ionic Conductors", Chem. & Eng. News, May 20, 1985, attempts to exploit these advantages in practical electrochemical devices have been limited by the physical properties of the SPE's.

A large number of polymer electrolytes are known at present. One of their characteristic features is formation of a complex between a lithium salt and an organic polymer (matrix) having an electron donor atom such as O or N. The complex is stabilized by the $X^-$ anion, which usually has a large size.

For example, such a complex formed from a soluble salt of an alkali metal (MX) and polyethylene oxide (PEO) is known to form an SPE, French Patent No. 7832978. Unfortunately, the conductivity of the SPE based on PEO attains conductivity values of $10^{-4}$ to $10^{-3}$ $Ohm^{-1}cm^{-1}$ only at temperatures higher than about 100° C. These temperatures are considerably higher than the melting temperature of the polymer. The low values of the ionic conductivity at ambient temperature ($10^{-6}$ to $10^{-7}$ $Ohm^{-1}cm^{-1}$), which are caused by crystallinity of the polymer structure, is a major disadvantage for SPE's based on PEO and limits practical use of such electrolytes.

Therefore, in recent years attempts are being made to improve the electrical properties by means of modifying the composition of known SPE's, e.g., U.S. Pat. No. 5,102,751 to Narang and references cited therein. Narang is directed at providing plasticizers that enhance the ionic conductivity and mechanical properties. The highest ionic conductivity disclosed by Narang, $3.8 \times 10^{-4}$ $Ohm^{-1}cm^{-1}$, is not as high as is desired for SPE's having practical value. SPE's containing plasticizers have the further disadvantage of requiring additional materials that may make the SPE's more complicated and more expensive to manufacture.

The above-mentioned references include SPE's that are known as "solvent free". However, preparation of SPE's consisting of a liquid electrolyte held by a polymer has also been reported in the recent scientific and patent literature. Such jelly-like or solvent-swollen electrolytes exhibit higher ionic conductivity.

Solid polymer electrolytes based on the combination of a thermally cross-linked polyacrylonitrile (PAN) polymer (15–85 mole %), $LiClO_4$ (4–21 mole %) and an organic solvent (10–75 mole %) with a high dielectric constant, such as ethylene carbonate, propylenecarbonate and dimethylformamide, are known which have higher conductivity at ambient temperature, M. Watanabe, M. Kanba, N. Nagaoka and I. Shinohara, J. Appl. Polymer Sci., vol. 27, 4191 (1982). Such polymer electrolytes may be prepared by dissolving the polymer and the lithium salt in one of the high-dielectric solvents and then coating the polymer as a thin film, for example, on a polytetrafluoroethylene (Teflon™) substrate. Such thin films may be referred to as hybrid systems having a solid polymeric structure with a liquid phase dispersed therein. In such thin films the PAN polymer forms a three-dimensional network (jelly) containing stable solvate complexes formed by the lithium salt and the organic solvent.

Since the quantity of liquid phase stored in a film prepared in this manner depends on the preparations conditions and on the ambient thermodynamic conditions (temperature and pressure) during storage, the composition of the film may not be permanently established during preparation of the film. Arbitrary and accidental changes in composition of the film may occur either during preparation or on storage and usage. Such changes may produce undesirable changes in the ionic conductivity of the electrolyte.

For example, as seen in FIG. 2 in Watanabe et al., the ionic conductivity is a function of the molar ratio of the solvent to the lithium salt in the PAN copolymer, [solvent]/[$LiClO_4$], and reaches a constant value of about $10^{-4}$ $Ohm^{-1}cm^{-1}$ only if the molar ratio exceeds about 2. At values of the molar ratio less than 2, even small changes in the molar ratio lead to sharp, orders-of-magnitude, changes in ionic conductivity. Thus, if the solvent content is below a certain level, the ionic conductivity in such a system falls as low as about $10^{-7}$ $Ohm^{-1}cm^{-1}$ at ambient temperature due to disappearance of the liquid-type conductivity.

Recently it has been reported in U.S. Pat. No. 5,219,679 to Abraham that ionic conductivities as high as $4 \times 10^{-3}$ $Ohm^{-1}cm^{-1}$ have been measured at 20° C. for SPE's comprising a polyacrylonitrile matrix containing a solvent mixture of propylene carbonate and ethylene carbonate. The high ionic conductivity is attributed to the formation of lithium, or other alkali or alkaline earth metal, salt solvates of organic solvents having high dielectric constants. Abraham discloses that an IR spectrum of the film showed that the lithium ions were coordinated with the C=O groups in the ethylene carbonate or the propylene carbonate. Since the high ionic conductivity in such systems is based on formation of lithium ion solvate complexes with the solvent, the nature of the polymer suitable for use as a matrix for immobilizing or encapsulating the Li-salt-solvate phase is of less importance.

In addition to the above-cited disadvantages of solvent-containing SPE's, such SPE's cannot be used in electrochemical cells that are in contact with highly reactive electrodes such as lithium metal.

A high concentration of the organic electrolyte solvent may hinder the reversible reaction of the Li deposition-dissolution due to possible redox transformations of the organic solvent in the range of potentials determined by the anode and cathode materials.

Thus, it is known, J. O. Besenhard, G. Eichinger, "High Energy Density Lithium Cells", J. Electroanal. Chem., vol. 68, pp. 1–18, (1978), that solvents such as propylene carbonate and ethylene carbonate may interact with lithium, both chemically and electrochemically, leading to the formation of lithium carbonate and, thereby, hindering the reversibility of the electrochemical reaction. Moreover, the migration of the low-molecular substances responsible for ion transport in the electrical field gradient leads to gradual change sin the electrolyte composition and, consequently, to rapid degradation of the electrical properties.

And finally, films containing 60–80% of a liquid phase do not satisfy one of the main demands made on SPE's, that is, high mechanical strength. According to U.S. Pat. No. 5,219,679 to Abraham, free-standing SPE films can be obtained at room temperature by cooling the solution of components from 120° C. to room temperature. Such a process leads to loss of fluidity and to solidifying of the solution as a solid film due to the increased effective viscosity of the system. However, the viscosity and, consequently, the mechanical strength, of such hybrid films depends strongly upon temperature and sharply decreases upon heating.

Solvent-free SPE's that have a stable lithium-ion conductivity greater than about $10^{-3}$ $Ohm^{-1}cm^{-1}$, that are capable of forming flexible thin films and that are simple and inexpensive to manufacture from readily available raw materials would be desirable.

ADVANTAGES AND SUMMARY OF THE INVENTION

An object of the subject invention is to provide solid polymer electrolyte compositions having stable, high lithium-ion conductivity at ambient temperature.

More specifically, an object of the subject invention is to provide a method for preparing electrolyte compositions that have stable lithium-ion conductivity values as high as about $10^{-3}$ $Ohm^{-1}$ $cm^{-1}$ at ambient temperature.

Another object of the subject invention is to prepare a solid polymer electrolyte containing active groups capable of forming coordination bonds with an ionizable lithium salt, wherein the solid polymer electrolyte provides lithium-ion conductivity without use of a solvent.

It is a specific object of the present invention to prepare a solid polyacrylonitrile copolymer electrolyte that makes high lithium-ion conductivity possible by means of forming coordination bonds between free nitrile groups, —C≡N, and lithium ions as shown below:

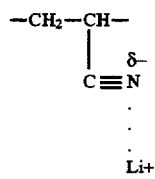

An advantage of the present invention is that, since the SPE is solvent-free, the high ionic conductivity is not depending on uncontrollable changes in solvent content.

It is yet another object of the present invention to use an amorphous polyacrylonitrile copolymer to prepare the solid polymer electrolyte having high ionic conductivity. It is yet another object of the present invention to use conditions for preparing the amorphous polyacrylonitrile copolymer such that high levels of free nitrile groups are present in the amorphous copolymer.

It is still another object of the subject invention to maintain high chain flexibility in the amorphous copolymer used in making the SPE by using preparation conditions that end to prevent nitrile cyclization and nitrile cross-linking reactions.

It is still another object of the present invention to prepare lithium-ion conductive solid polymer electrolytes that may be used in a flexible thin film in a high energy density rechargeable lithium battery.

It is yet another object of the present invention to prepare lithium ion conductive solid polymer electrolytes that have a high conductivity that is due almost entirely to ionic conductivity and wherein the electron conductivity is negligible.

It is yet another object of the present invention to provide solid polymer electrolytes that may be used with other ionizable metal salts, such as ionizable alkali metal or ionizable alkaline-earth metal salts.

It is still another object of the subject invention to provide solid polymer electrolytes that may be used in an electrochemical device.

These and still other objects, benefits and advantages are realized for an ionically conductive solid polymer electrolyte comprising a substantially solvent-free electrolyte including an amorphous polyacrylonitrile polymer and an ionizable metal salt. More specifically, the subject invention relates to a substantially solvent-free, lithium-ion conductive solid polymer electrolyte including an amorphous polyacrylonitrile copolymer and an ionizable lithium salt, wherein the polyacrylonitrile copolymer is substantially free of nitrile-cyclization or nitrile cross-linking and the electrolyte contains coordination complexes formed from nitrile groups and lithium ions.

The subject invention further relates to a method of preparing electrolytes having a high ionic conductivity comprising preparing a solution of a polyacrylonitrile polymer and an ionizable metal salt in an organic solvent, casting the solution onto a substrate such as to form a coating on the substrate and removing the organic solvent from the coated substrate in a manner such as to produce a substantially solvent-free electrolyte including an amorphous polyacrylonitrile polymer and an ionizable metal salt. More specifically, the subject invention relates to removing the organic solvent by (1) evaporating the organic solvent from the coated substrate at a pressure of about $1 \times 10^3$ to about $4 \times 10^3$ Pa and at a temperature of about 0° to about 25° C., and then separating a thin film from the substrate;

(2) further evaporating the organic solvent from the thin film at a pressure of about 1 to about 14 Pa and at a temperature of about 0° to about 25° C., wherein the further evaporation is continued until the weight change of the film is less than about 0.1 weight percent over a ten hour period; and (3) evaporating remaining traces of the organic solvent from the thin film at a pressure of about 1 to about 14 Pa and at a temperature of about 45° to about 70° C.

BRIEF DESCRIPTION OF THE DRAWING

FIG. 1 shows the temperature dependence of the conductivity of the subject SPE's.

DETAILED DESCRIPTION OF THE PREFERRED EMBODIMENTS

The methods by which the objects, features and advantages of the present invention are achieved will now be described in more detail. These particulars provide a more precise description of the invention for the purpose of enabling one or ordinary skill in the art to practice the invention, but without limiting the invention to the specific embodiments described.

The PAN polymers used to prepare the solid polymer electrolytes of the subject invention may be prepared using known techniques or they may be obtained from many different commercial sources that produce PAN polymers. Such PAN polymers are widely known and are typically used in fiber manufacturing, *Man-Made Fibers*, Science and Technology, Ed. H. F. Mark, S.. M. Atlas, E. Lernia, Interscience Publ., vol.. 1 (1967); and Z. A. Rogovin, Fundamentals of Chemistry and Technology of Chemical Fibers (in Russian), vol. 2, Moscow, Khimia (1974). Preferably, the PAN polymers that are used to prepare the subject SPE's are PAN copolymers. A large number of compounds have been disclosed in the prior art to be used as the additional monomer or mixture of additional monomers that may be used to prepare the PAN copolymer. The commercially available PAN copolymers typically have similar compositions, have a molecular weight of $10^4-10^5$, have about 90–95 weight % of the copolymer obtained from acrylonitrile and have similar chemical and physical properties. Preferably, the PAN copolymers that are used to prepare the subject SPE's may be selected from those PAN copolymers that are produced in relatively large production volumes so that the SPE's may be produced using inexpensive raw materials that are readily available.

PAN copolymers are typically copolymerized from a mixture of monomers including acrylonitrile, or a derivative thereof, as the predominant monomer, with a small amount of an additional monomer or a mixture of additional monomers. While it is contemplated that a large number of different monomers may be combined with the acrylonitrile monomer to produce PAN copolymers suitable for use in the SPE's of the present invention, the preferred monomers are acrylic acid, methacrylic acid, itaconic acid or another vinyl group-containing carboxylic acid, an ether of acrylic acid or methacrylic acid and vinylacetate. The groups that are introduced into the polymer backbone by the reacting monomers are herein referred to as the residual units of the respective reacting monomers. Preferably, the PAN copolymers that may be used to prepare the SPE's of the subject invention are copolymerized from a mixture comprising more than 90 weight % of the acrylonitrile monomer. Most preferably, the PAN copolymer is copolymerized from a mixture comprising 93 to 95 weight % of the acrylonitrile monomer. The most preferred PAN copolymers disclosed herein contained 93 weight % acrylonitrile residual units, 5.7 weight % methacrylic acid residual units and 1.3 weight % itaconic acid residual unit and had a mean molecular weight of about 66,500.

The preferred PAN copolymers are those which have an amorphous structure. The amorphous structure of PAN copolymers is a known characteristic of such copolymers and may be confirmed using well-known techniques. Typically, an absence of sharp crystalline reflections in the x-ray diffraction pattern of the copolymer may be used as an indication that the copolymer is substantially amorphous. Preferably, the degree of crystallization of the amorphous PAN copolymer is less than about 10%.

The ionizable lithium salt may be either an organic or an inorganic salt of lithium. Such salts may be obtained from known commercial suppliers. Preferably, the ionizable lithium salt comprises a large anion having highly delocalized charge, for example, $LiClO_4$. Other ionizable lithium salts that may be used include $LiCF_3SO_3$, $LiBF_4$ and $LiSCN$. Preferably, the molar ratio of the units of the ionizable lithium salt to the residual units of acrylonitrile in the PAN polymer is from about 15:85 to about 40:60. Most preferably the molar ratio of the ionizable lithium salt to the acrylonitrile units in the PAN polymer is about 33:67.

While not intending to be limited to the theory of operation, as hereinafter described, of the subject invention, it is believed that the lithium-ion conductivity of the subject PAN copolymer structure is achieved by formation of complexes of nitrile groups of the PAN copolymer with lithium ions from the ionizable lithium salt. Furthermore, it is believed that the high ionic conductivity at ambient temperature is due to a combination of factors, especially including the combination of an amorphous structure of the PAN copolymer together with a high concentration of nitrile groups that are present in the structure. Thus, although the subject invention may be prepared from PAN homopolymers, the PAN copolymer is preferred over the homopolymer since ti is believed that the polar groups, such as CO, COOH and OH, in the PAN copolymer tend to increase the segmental flexibility of the copolymer backbone. The polar groups tend to hinder dense packing of the copolymer into a crystal structure and, thus, tend to increase the free volume of the system, which assists in providing the amorphous structure that is desired. However, insofar as PAN homopolymers may also be prepared wherein an amorphous structure is produced, such amorphous PAN homopolymers also fall within the scope of the present invention.

In addition to the polar group-containing segments in the copolymer backbone, it is believed that the special thermal conditions used to prepare the SPE's from the subject PAN copolymers also contribute to producing highly amorphous structures having high ionic conductivity. In particular, it has been discovered that the ionic conductivity values of the preferred PAN copolymer-based films tend to be the highest if the highest temperature used to prepare the amorphous structures is not higher than about 70° C. This is well below the glass-transition temperature of the copolymer, which is about 85° C. Such conditions tend to prevent cyclization and cross-linking reactions involving the nitrile groups. If the thermal treatment of the PAN copolymers is permitted to take place at temperatures that are too high, a much more complex macromolecular polymer network is formed, causing both a loss of chain flexibility and a decrease in the concentration of the nitrile groups. This is believed to reduce the concentration of active nitrile groups available to contribute to ionic conductivity and, thus, to a decrease in ionic conductivity at ambient temperature. An increase in ionic conductivity as a function of the nitrile-group concentration, as observed for SPE's of the subject invention, makes it possible to conclude that the ionic conductivity is proportional to the nitrile group concentration.

Preferably, the solid polymer electrolytes are prepared in a manner such that substantially all the nitrile groups introduced into the polymer backbone structure by the acrylonitrile monomers remain as "free" nitrile groups that are available to form coordination complexes with the lithium ions. "Free" nitrile groups are herein defined to be those that have not undergone nitrile-cyclization or nitrile crosslinking reactions and, thus, are capable of functioning as active nitrile groups that are capable of forming coordination complexes with lithium ions and, thus, contributing to the high ionic conductivity. The net result is that the substantially solvent-free electrolyte containing the amorphous PAN copolymer and ionizable lithium salt prepared according to the method of the subject invention has surprisingly high lithium-ion conductivity. In particular, it is surprising that solvent-free SPE's based on PAN-copolymers are capable of producing an ionic conductivity of $10^{-3}$ to $10-2$ $Ohm^{-1}cm^{-1}$, as required for use in practical electrochemical cells. This surprising result, which is achieved in the substantial absence of any solvent, is attributed to the presence of a high concentration of coordination complexes formed between the free nitrile groups and the lithium ions that are provided by the ionizable lithium salt. IR spectroscopy measurements may be used to confirm the presence of these coordination complexes. These types of measurements are known to one of ordinary skill in the art, B. I. Lirova, A. A. Tager and E. A. Lyutikova, Russian J. Vysokomolekvlyarnye Soedineniya B, vol. 22, 99 (1980).

The presence of a high concentration of free nitrile groups that are substantially unreacted by be confirmed using techniques also known to one of ordinary skill in the art, e.g., IR-spectroscopy. Preferably, the IR spectrum contains only those lines characteristic of the free, unreacted, nitrile groups and the lines characteristic of reacted nitrile groups are substantially absent. The presence of cyclization or cross-linking reactions of the nitrile group may also be detected by changes in the color of the films produced from the PAN copolymer. Cyclization and cross-liking reactions produce films having a yellow color. A lack of color indicates a substantial absence of nitrile-cyclization or cross-linking reactions. In addition, since cross-linked copolymer is more difficult to dissolve, a lack of cross-linked copolymer may also be indicated by the ease with which the copolymers may be dissolved in an organic solvent. Use of PAN copolymers that are readily soluble in an organic solvent helps to promote formation of the highly flexible, thin, transparent films that are desired in high energy density rechargeable lithium batteries.

The ionic conductivities herein referred to as "high" at ambient temperature relate to values of about $10^{-4}$ to $10^{-1}$ $Ohm^{-1} cm^{-1}$. The ionic conductivity may be measured using traditional impedance analysis techniques for measuring ac-conductivity, for example, as described in British Library Cataloguing in Publication Data Electrochemistry (Chemical Society, Specialist periodical reports), The Chemical Society, Burlington House, London WIVOBN, Vol. 7 (1980); West, A. R., Solid State Chemistry and Its Applications, John Wiley & Sons Ltd., (1984); and R. D. Armstrong, T. Dickinson, P. M. Willis, Electroanalytical Chemistry and Interfacial Electrochemistry, Vol. 53, 389 (1974). The electronic contribution to the ac-(total)-conductivity may be determined by making measurements of the direct current using a polarization cell having Ni-electrodes blocking to ions and non-blocking to electrons and by comparison of the values thus obtained with the ac-data. These types of measurements show that the electronic contribution to the overall conductivity is negligibly small in comparison to that of the ionic (cation and anionic) conductivity for SPE's of the subject invention.

The subject invention is further directed to disclosing a method for preparing a SPE by combining an ionizable lithium salt with a PAN polymer in a manner such that high lithium-ion conductivity is achieved at ambient temperature in a system that is substantially solvent-free. Although other means of achieving this objective may be contemplated by one of ordinary skill in the art while still remaining within the scope of the present invention, the preferred method comprises preparing a solution of a polyacrylonitrile polymer and an ionizable metal salt in an organic solvent, coating the solution onto a substrate and removing the organic solvent from the coated substrate in a manner such as to produce a substantially solvent-free electrolyte including an amorphous polyacrylonitrile polymer and an ionizable metal salt and such as to produce a PAN polymer that is substantially free of any cyclization or cross-linking reactions involving the nitrile groups. More specifically, the PAN copolymer and the ionizable lithium salt may be separately dissolved in an organic solvent such as dimethylformamide (DMF) and then merged or mixed to form a single solution of the polyacrylonitrile/ionizable-lithium salt. The solution may then be coated on a substrate such as a polytetrafluoroethylene (Teflon™) substrate. The coating step may be carried out using any of many known methods for preparing coatings of thin films, including spraying, dipping or casting. Preferably, the single solution containing the PAN polymer and the ionizable lithium salt is coated onto the substrate using the casting technique.

The coated substrate is thermally treated in a chamber wherein the temperature and pressure may be regulated in a carefully controlled manner such as to remove substantially all solvent without causing any crystallization of the amorphous PAN polymer and without causing nitrile-group cyclization or cross-linking reactions to occur. The absence of any crystallization may be determined using the x-ray diffraction technique (as cited above) and the absence of any nitrile-cyclization or cross-linking reactions may be determined using the IR spectroscopy technique, (also cited above). Preferably, substantially all the nitrile groups are present as free nitrile groups with none of the nitrile groups participating in cyclization of cross-linking reactions.

The organic solvent may be removed from the coated substrate by 1) evaporating the organic solvent from the coated substrate at a pressure of about $1 \times 10^3$ to about $4 \times 10^3$ Pa and at a temperature of about 0° to about 25° C., and then separating a thin film from the substrate;
2) further evaporating the organic solvent from the thin film at a pressure of about 1 to about 14 Pa and at a temperature of about 0° to about 25° C., wherein the further evaporation is continued until the weight change of the film is less than about 0.1 weight percent over a ten hour period; and
3) evaporating remaining traces of the organic solvent from the thin film at a pressure of about 1 to about 14 Pa and at a temperature of about 45° to about 70° C.

The first two steps of the thermal treatment are intended to promote rapid solvent removal so as to obtain a PAN polymer having an amorphous microstructure. The temperature of the thermal treatment should not exceed about 30° C. until the solvent is completely removed. Otherwise, several orders of magnitude of degradation of the ionic conductivity may occur. To accelerate evaporation of the high boiling DMF solvent (b.p.=152° C.), the first stage may be carried out at less than atmospheric pressure. Preferably, the solution should not boil. Otherwise, non-homogeneous bubbling may cause a layered film to be formed.

Preferably, the thin film is easily separated from the substrate before carrying out the second step of the thermal treatment. The residual solvent levels may then be removed at substantially lower pressures of about 1 to about 14 Pa, but still at a temperature of about 0° to about 25° C. The second stage of the thermal treatment is deemed to be substantially complete when the weight of the film becomes constant within an accuracy of about 0.1 weight percent. Once this point is reached, the third stage of thermal treatment may be carried out at about 45° to about 70° C. at a pressure of bout 1 to about 14 Pa. Under these conditions the remaining traces of solvent are substantially removed and the final amorphous structure of the film is established. As a means of confirming that substantially all solvent has been removed, the film may be subjected to a heat treatment of about 85° to about 90° C. in a low pressure, for example, about 1 to about 14 Pa, for about 24 hours. A sample weight change of less than about 0.1 weight % after this step is herein defined as a substantially solvent-free solid polymer electrolyte.

In addition to the high lithium-ion conductivity, the PAN copolymer systems thus produced have properties that are compatible with the wide range of performance characteristics required of a material to be used as a polymer electrolyte in high energy density rechargeable lithium batteries, electrochemical devices and sensors. Thus, the subject invention includes electrochemical cells comprising an anode, a cathode and a solid polymer electrolyte wherein the SPE is made in accordance with the subject invention.

The solid polymer electrolytes made in accordance with the subject invention may also be prepared wherein ionizable metal salts other than ionizable lithium salts are combined with a PAN polymer. For example, complex formation of the PAN polymer has been experimentally confirmed for the ionizable metal salts of Li, Na, Mg, Ca, Sr, Ba and La, Lirova et al. Thus, wherein the subject invention has been described in terms of lithium-ion conductivity and the formation of coordination complexes involving lithium ions, one of ordinary skill in the art would recognize that other ionizable metal salts or a mixture thereof may also be used to prepare solid polymer electrolytes that fall within the scope of the subject invention.

The invention will now be described in detail with respect to the specific preferred embodiments thereof, it being understood that the steps of the following example are intended to be illustrative only and that the invention is not intended to be limited to the materials, conditions, process parameters and the like recited herein.

EXAMPLE OF THE PREFERRED EMBODIMENT 4 ml of dry DMF were added to 0.5000 g of a polyacrylonitrile copolymer containing 5.7 weight percent methacrylic acid residual units and 1.3 weight percent itaconic acid residual units. The PAN copolymer was obtained from the Nitron Company in Saratov, Russia. The DMF had previously been distilled to remove traces of water. The mixture was stored for one day and allowed to swell to form a copolymer/DMF solution. 2 ml of dry DMF was added to 0.4662 g of dried lithium perchlorate, $LiClO_4$. The mixture was stored until the perchlorate completely dissolved to form a $LiClO_4$/DMF solution, which required about one hour. 4 ml more of the dry DMF was added to the PAN copolymer solution and the diluted copolymer solution was vigorously mixed for about 30 minutes. The $LiClO_4$/DMF solution was added to the copolymer/DMF solution and vigorously mixed for another 30 minutes to form a single solution of the PAN copolymer and the $LiClO_4$. The resulting solution was coated onto a Teflon™ substrate and the solvent was removed by evaporation at ambient temperature with gradually decreasing pressure down to about $1 \times 10^3$ Pa, at which point a thin film was formed on the substrate. The film was then easily separated from the substrate. The film-forming thermal treatment step took about 200 hours.

After the film was separated from the substrate it was subjected to further treatment for about 80 hours at ambient temperature and in a vacuum having a pressure of about 1 to about 14 Pa. The weight was checked after each 10 to 20 hours during this treatment. After 80 hours, the film reached a constant weight within an accuracy of about 0.1 weight percent. The film was then stored at about 45° C. for about 24 hours in a vacuum having a pressure of about 1 to about 14 Pa. It was then slowly cooled to ambient temperature.

All steps in the preparation of the film were carried out under moisture-free conditions. A transparent, visually-homogeneous film was produced using this method. The film had physical properties such as those that are required for a solid polymer electrolyte. For example, the flexibility of the film was such that it could be folded over double without breaking. Surprisingly films prepared in this manner were found to have an ionic conductivity up to about $10^{-2}$ $Ohm^{-1}cm^{-1}$ at ambient temperature. The film had a composition comprising 51.8 weight percent of PAN copolymer and 48.2 weight percent of $LiClO_4$. This corresponds to a molar ratio of the $LiClO_4$. This corresponds to a molar ratio of the $LiClO_4$ to the acrylonitrile units of about 33.3:66.7. A weight analysis was carried out by weighing the sample with an accuracy within about 0.0002 g and then subjecting it to a heat treatment of about 85° to about 90° C. in a vacuum having a pressure of about 1 to about 14 Pa for 24 hours. After cooling to ambient temperature, it was weighed again. No change in the sample weight was observed within the limits of accuracy employed. These weight measurements showed the weight was invariant within about 0.1 weight percent and, thus, that the film was substantially solvent-free.

The ionic conductivity was measured by an impedance analysis technique as described above. These measurements confirmed the conductivity was due to ionic conductivity and that the electron conductivity was less than about $10^{-5}$ times the ionic conductivity.

What is claimed is:

1. A solid polymer single phase electrolyte comprising:
   a substantially solvent-free electrolyte including an amorphous polyacrylonitrile polymer and an ionizable metal salt.

2. The solid polymer electrolyte of claim 1 wherein said amorphous polyacrylonitrile polymer is substantially free of nitrile-cyclization or nitrile cross-linking.

3. The solid polymer electrolyte of claim 1 wherein said ionizable metal salt comprises a metal selected from the group consisting of lithium, sodium, magnesium, calcium, strontium, barium and lanthanum.

4. The solid polymer electrolyte of claim 1 wherein said ionizable metal salt comprises lithium.

5. The solid polymer electrolyte of claim 1 wherein said electrolyte contains coordination complexes formed from nitrile groups and metal ions.

6. The solid polymer electrolyte of claim 1 wherein said electrolyte contains coordination complexes formed from nitrile groups and lithium ions.

7. The solid polymer electrolyte of claim 1 wherein said polyacrylonitrile polymer comprises a polyacrylonitrile copolymer.

8. The solid polymer electrolyte of claim 7 wherein more than about 90 weight percent of said polyacrylonitrile copolymer is obtained from acrylonitrile.

9. The solid polymer electrolyte of claim 7 wherein from about 93 to about 95 weight percent of said polyacrylonitrile copolymer is obtained from acrylonitrile.

10. The solid polymer electrolyte of claim 7 wherein about 93 weight percent of said polyacrylonitrile copolymer is obtained from acrylonitrile, about 5.7 weight percent is obtained from methacrylic acid and about 1.3 weight percent is obtained from itaconic acid.

11. The solid polymer electrolyte of claim 1 wherein the degree of crystallization of said amorphous polyacrylonitrile polymer is less than about 10%.

12. The solid polymer electrolyte of claim 1 wherein said electrolyte has an ionic conductivity larger than about $10^{-4}$ $Ohm^{-1}cm^{-1}$ at a temperature of about 20° C.

13. The solid polymer electrolyte of claim 1 wherein said electrolyte has an ionic conductivity larger than about $10^{-3}$ $Ohm^{-1}cm^{-1}$ at a temperature of about 20° C.

14. The solid polymer electrolyte of claim 1 wherein substantially all the nitrile groups contained in the acrylonitrile used to produce said polyacrylonitrile polymer are present in said polyacrylonitrile polymer as free nitrile groups.

15. The solid polymer electrolyte of claim 7 wherein said polyacrylonitrile copolymer has a number average molecular weight from about $10^4$ to about $10^5$.

16. The solid polymer electrolyte of claim 7 wherein said polyacrylonitrile copolymer has a number average molecular weight of about 60,000 to about 70,000.

17. The solid polymer electrolyte of claim 4 wherein said ionizable lithium salt comprises a salt selected from the group consisting of $LiClO_4$, $LiCF_3SO_3$, $LiBF_4$ and LiSCN.

18. The solid polymer electrolyte of claim 4 wherein said ionizable lithium salt comprises $LiClO_4$.

19. A method of preparing a solid polymer single phase electrolyte comprising:

preparing a solution of a polyacrylonitrile polymer and an ionizable metal salt in an organic solvent;

casting said solution onto a substrate such as to form a coating on said substrate; and removing said organic solvent from the coated substrate in a manner such as to produce a substantially solvent-free electrolyte including an amorphous polyacrylonitrile polymer and an ionizable metal salt.

20. The method according to claim 19 wherein the preparation of said solution comprises:

dissolving said polyacrylonitrile polymer in a first portion of said organic solvent;

dissolving said ionizable metal salt in a second portion of said organic solvent;

combining said portions in a manner such as to form said solution of said polyacrylonitrile polymer and said ionizable metal salt.

21. The method according to claim 19 wherein the removal of said organic solvent comprises:

(1) evaporating said organic solvent from said coated substrate at a pressure of about $1\times10^3$ to about $4\times10^3$ Pa and at a temperature of about 0° to about 25° C., and then separating a thin film from the substrate;

(2) further evaporating said organic solvent from the thin film at a pressure of about 1 to about 14 Pa and at a temperature of about 0° to about 25° C., wherein said further evaporation is continued until the weight change of said film is less than about 0.1 weight percent over a ten hour period; and (3) evaporating remaining traces of said organic solvent from said thin film at a pressure to about 1 to about 14 Pa and at a temperature of about 45° to about 70° C.

22. The method according to claim 19 wherein said organic solvent comprises dimethylformamide.

23. An electrochemical cell comprising:

an anode, a cathode and a solid polymer single phase electrolyte, wherein said solid polymer electrolyte comprises a substantially solvent-free electrolyte including an amorphous polyacrylonitrile polymer and an ionizable metal salt.

24. A solid polymer single phase electrolyte comprising:

a substantially solvent-free electrolyte including an amorphous polyacrylonitrile copolymer and $LiClO_4$, wherein said amorphous polyacrylonitrile copolymer is substantially free of nitrile-cyclization or nitrile crosslinking, said electrolyte contains coordination complexes formed from nitrile groups and lithium ions and about 93 weight percent of said polyacrylonitrile copolymer is obtained from acrylonitrile, about 5.7 weight percent of said polyacrylonitrile copolymer is obtained from methacrylic acid and about 1.3 weight percent of said polyacrylonitrile copolymer is obtained from itaconic acid.

* * * * *